Figure 1:
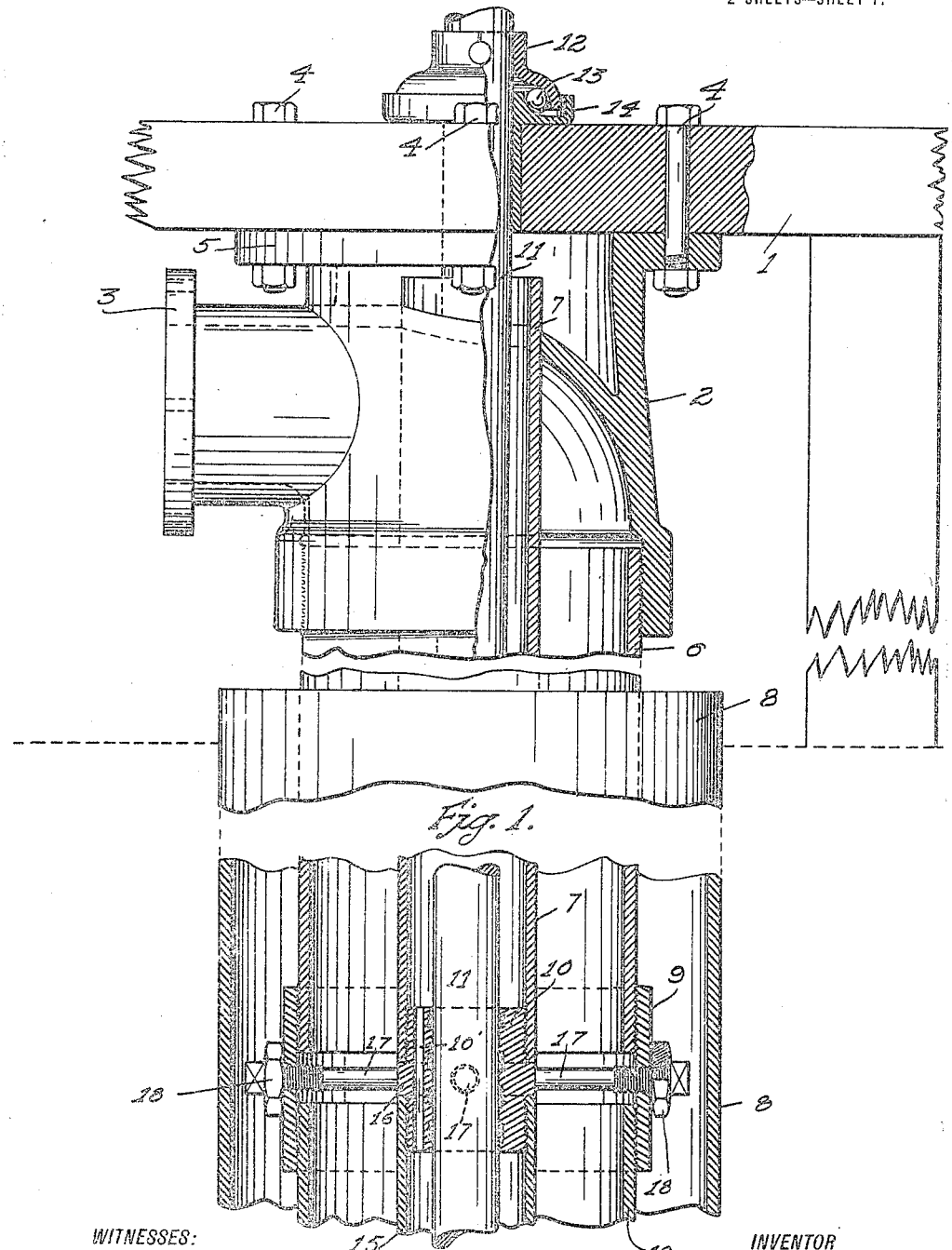

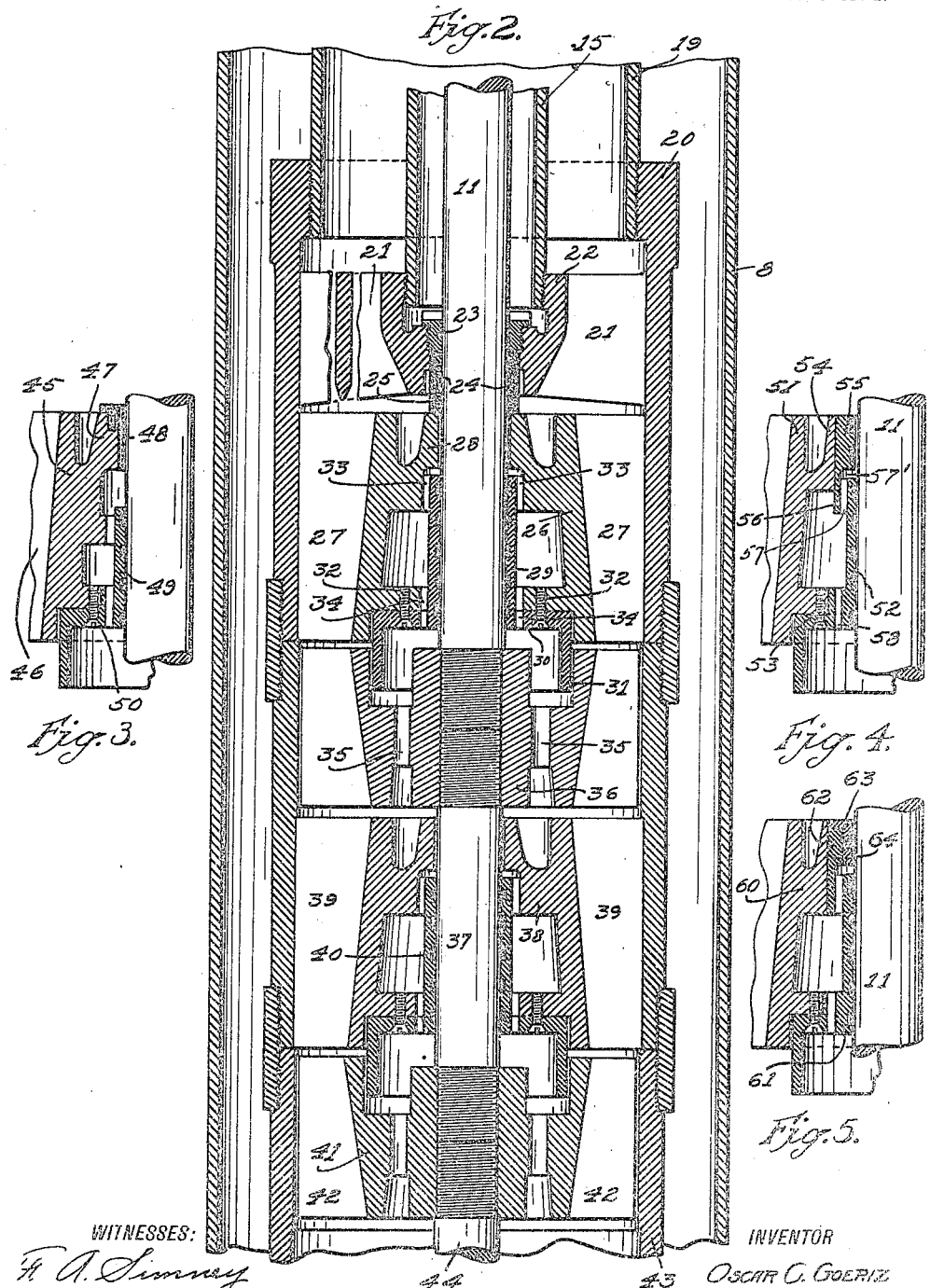

UNITED STATES PATENT OFFICE.

OSCAR C. GOERIZ, OF OAKLAND, CALIFORNIA.

ROTARY PUMP.

1,154,110.  Specification of Letters Patent.  Patented Sept. 21, 1915.

Application filed September 25, 1912, Serial No. 722,247. Renewed July 27, 1915. Serial No. 42,235.

*To all whom it may concern:*

Be it known that I, OSCAR C. GOERIZ, a citizen of the Empire of Germany, residing at Oakland, in the county of Alameda and State of California, have invented a new and useful Rotary Pump, of which the following is a specification in such full and clear terms as will enable those skilled in the art to construct and use the same.

This invention relates to rotary pumps of any description.

One of the objects of the invention is to provide a bearing for such a pump which will be capable of use with very dirty water without injury thereto.

Another object of the invention is to provide means whereby the water may have access to certain of the bearings without, at the same time, injuring them, a filtering medium being provided to prevent grit and dirt from having access to the part of the apparatus sought to be protected thereby.

It will be understood by those skilled in the art that it is very difficult to prevent water from having access in such an apparatus as this, so that means is provided herein to permit water to have access to such of the parts as it cannot well be prevented from passing to, but a filter is interposed to prevent sand and sludge from passing in with the water.

In the drawings in which the same numeral of reference is applied to the same portion throughout the several views, Figure 1 is a side elevation partly in section of the pump support and the upper portion of the well pipe and pump pipe, Fig. 2 is a vertical sectional view of the lower portion of the well pipe and the operating parts of the pump at the bottom of the well, it being understood that this pump may be assembled with any number of sets of runner and diffuser blades, two runners being shown in the drawings, Fig. 3 is a broken sectional view of a modified form of the bearing used in the diffusers, and Figs. 4 and 5 are other slightly modified forms of the bearings for the diffusers.

The numeral 1 represents any suitable support for the pump head 2, which pump head is provided with a flanged elbow 3 to direct the water in a horizontal direction. The pump head is secured to the support 1 by means of suitable bolts 4 which pass through a flange 5 on the pump head. The lower portion of the pump head is threaded and has an outer pump pipe 6 screwed thereinto, while passing through the pump head is a smaller pipe to secure and aline the shaft bearings and the shaft. The well pipe is indicated at 8.

The pipe 6 is screwed into a suitable coupling at 9, while the pipe 7 is screwed over a bearing 10 for the shaft 11. The shaft 11 is supported by means of a suitable thrust bearing 12 having balls 13 and a cup 14 resting upon the support 1.

The bearing 10 has threads at each end, one threaded end being passed into the pipe 7 while the other threaded end is passed into the lower pipe 15. This bearing is flanged at 16 and is adjusted centrally within the pipe 6 by means of adjusting bolts 17, of which there may be any suitable number, four being used with the construction indicated in Fig. 1. The bearing 10 which is preferably of an oilless type is provided with an opening 10' therethrough in order to permit the water which passes into the pipe 15 to pass on up to whatever level it may be desired, and when the pump is not in use this opening permits the water to escape downwardly therethrough and out at the screen ring 24, thus carrying off any sludge which may find access to the interior of said pipe 15.

The bolts 17 are threaded into the coupling 9 between the ends of the two pipes 6 and 19. The bolts are held in a given adjustment by the lock nuts 18. The pipe 19 is screwed into a casting 20 which casting is provided with a series of straight blades 21 extending radially from the outer portion of the casting to an inner annulus 22 thereof. This inner annulus has the pipe 15 threaded thereinto and is provided with a loosely fitting bearing 23 having a plurality of perforations therethrough at 24. The bearing 23 is screwed into the annulus 22 and the perforations therein permit the access to the shaft of the water under pressure. However, to prevent sand and grit from reaching said shaft, a suitable fabric 25 is secured around the outside of the lower portion of the bearing 23 so that while the water may pass therethrough, practically no sand can do so. Below the annulus 22 there is another annulus 26. The annulus 26 has suitable diffuser blades 27 extending therefrom to the outer shell of the casting 20 and the upper portion of the annulus 26 is bored at 28 so it almost contacts with the shaft.

The shaft is held in alinement by means of a suitable bearing 29. This bearing has a flange 30 and a downwardly extending skirt 31 which is secured to the lower portion of the annulus 26 by means of suitable screws 32 extending through the flange 30. This bearing is of a well known type having graphite fillings therein, which will permit the running of the bearing without the use of oil. However, to prevent water from passing therethrough a suitable number of small openings 33 are provided surrounding the top of the bearing under the overhanging portion of the annulus at 28. Similar openings 34 extend through the lower part of the annulus 26 and through the flange 30. The result of this construction is that there is an ample passage way for the small amount of water leaking through 28 from the high pressure side of the diffuser to the low pressure side. The water then passes through openings 35 in the runner 36 to the suction side of the same. The bearing 29 is tight enough to hold the shaft in perfect alinement and it will also prevent any water from passing therethrough since the passage ways outside the bearings are able to carry off much more water than is likely to leak through 28. The amount of water thus leaking back is practically negligible when compared with the water handled by the pump.

The shaft 11 terminates in the center of the runner 36 and another shaft 37 is screwed into the runner below the shaft 11. This shaft extends through a diffuser 38 having blades 39 and within which diffuser is screwed a bearing 40 precisely like the bearing used in the upper diffuser. This diffuser is substantially the same as the upper diffuser, save that it is not provided with the straight terminal blades 21. Another runner 41 with blades 42 is secured to the lower end of the shaft 37, another diffuser set 43 and an additional shaft 44 may be used if desired. However, the pump is complete when it terminates with a set of diffuser blades.

It is intended that all of the bearings which are inaccessible or liable to injury by dirty water shall be of an oilless type to lessen the possibility of carrying grit into them, and in addition the construction of the diffusers and parts surrounding the shafts is such to as far as possible prevent grit from having access to the bearings. Should any sand reach the top of the bearings the openings around the outside thereof are intended to at once carry it away.

In Figs. 3, 4 and 5 are shown modified forms of the choking passage 28 above the bearings.

Fig. 3 shows the hub of the diffuser blades at 45, diffuser blades 46 and the overhanging annulus at 47. Since it may happen that many particles of sand may pass between this overhanging annulus and the shaft 11, a removable flanged bushing 48 is inserted on the overhanging annulus 47, said annulus being bored small enough to prevent anything but the finest material from passing between it and the shaft. The lower bearing 49 is of substantially the same form as the bearing shown in Fig. 2 and is secured to the hub of the diffuser in the same way, by means of screws 50.

In Fig. 4 there is indicated at 51 the hub of the diffuser and the bearing 52 surrounding the shaft 11 is secured to the hub by means of screws. However, the overhanging annulus 54 is bushed out close to the shaft 11 by means of a ring 55 integral with the bearing 52 and having a downwardly extending apron 56. This bearing has an annular chamber 57' and openings 57 therethrough just below the ring 55, and at the lower portion thereof it is provided with openings 58 to permit the water to escape to the runner.

In Fig. 5 the diffuser hub is indicated at 60; the shaft bearing at 61 and the overhanging annulus at 62. This overhanging annulus is bushed out close enough to the shaft 11 to prevent anything but the finest material from passing between it and the shaft 11 by means of a renewable bushing 63 screwed into the top of the ring 64 integral with the bearing 61. This bearing has holes therethough the same as the bearing shown in Fig. 4 to permit the escape of water to the lower pressure side.

It will be understood that the particular shape of the runner blades and the diffuser blades is not a part of the invention disclosed herein, so that those blades are shown without an indication of their true configuration.

Having thus described my invention what I claim as new and desire to secure by Letters Patent of the United States is as follows:

1. A rotary pump comprising a discharge casing, a discharge pipe connected with said casing, a smaller pipe connected with said casing, a runner adjacent said casing, a shaft to which said runner is connected, a bearing for the shaft within the discharge casing, a bearing for the shaft within the smaller pipe, and a foraminous filter surrounding the shaft to allow water to pass to and to prevent gritty particles from having access to said bearings, as described.

2. A rotary pump comprising a discharge casing, a discharge pipe connected therewith, a runner adjacent the casing, a shaft extending through said casing to which the runner is secured, a bearing in the casing for the shaft, a second pipe connected with said casing and surrounding the shaft, a bearing within the latter pipe for the shaft, means to adjust the alinement of said bearing, and a screen bushing to prevent the access of grit to said shaft and the bearings therefor, as described.

3. In a rotary pump, a discharge casing, a runner adjacent said casing, a shaft to which the runner is secured, a discharge pipe, a smaller pipe surrounding the shaft, a bearing for said shaft within the smaller pipe, said bearing having equalizing passages for the escape of water from said pipe, and a foraminous filter surrounding the shaft to permit water to pass into the inner pipe and to prevent grit from passing thereinto, as described.

4. In a rotary pump, a discharge casing, a runner, a shaft therefor, a bearing for the shaft, said casing and bearing having passage ways to permit the escape of water without passing over the bearing surface, a foraminous bushing surrounding the shaft adjacent the bearing, and a foraminous filter around the bushing to prevent the access of grit to the bearing surface.

5. In a rotary pump, a discharge casing, a shaft to which the runner is secured, a bearing in the discharge casing for said shaft, said casing and bearing having passages for the escape of water to the low pressure side thereof, and a foraminous filter to prevent the access of gritty particles to said bearing on the high pressure side thereof, as described.

6. In a rotary pump, a submerged discharge casing, a runner adjacent said casing, a shaft to which said runner is secured, leakage restricting means around said shaft to allow a small quantity of water to pass through the discharge opening, a close bearing for said shaft adjacent the leakage restricting means, said bearing and casing having ample openings to permit the escape of water passing through the leakage restricting means to the low pressure side of the discharge casing without passing through the interior of the bearing, and means to prevent gritty particles from coming into contact with the shaft and leakage ring, substantially as described.

7. In a rotary pump, a submerged discharge casing, a runner adjacent said casing, a shaft to which said runner is secured, a renewable leakage restricting bushing around said shaft, a tight bearing for the shaft adjacent the leakage restricting bushing, said casing and bearing having openings of greater area than the opening at the leakage restricting means to permit the leakage water to return to the low pressure side of the discharge casing without passing through the inside of said bearing, and means to prevent gritty particles from coming into contact with the shaft and leakage ring, substantially as described.

8. In a rotary pump, a submerged discharge casing, a runner adjacent said casing, a shaft to which said runner is secured, a tight bearing for said shaft, a renewable bushing carried by said bearing for restricting the leakage at said shaft, said bearing also having openings of greater area than the opening at the leakage restricting bushing to permit the leakage water to return to the low pressure side of the discharge casing without passing through the inside of said bearing, and means to prevent gritty particles from coming into contact with the shaft and leakage ring, substantially as described.

In testimony whereof I have hereunto set my hand this 18th day of September A. D. 1912, in the presence of the two subscribed witnesses.

OSCAR C. GOERIZ.

Witnesses:
C. P. GRIFFIN,
HENRY B. LISTER.